No. 662,177. Patented Nov. 20, 1900.
H. TOLMAN.
ELASTIC TIRE FOR VEHICLES.
(Application filed May 5, 1900.)
(No Model.)
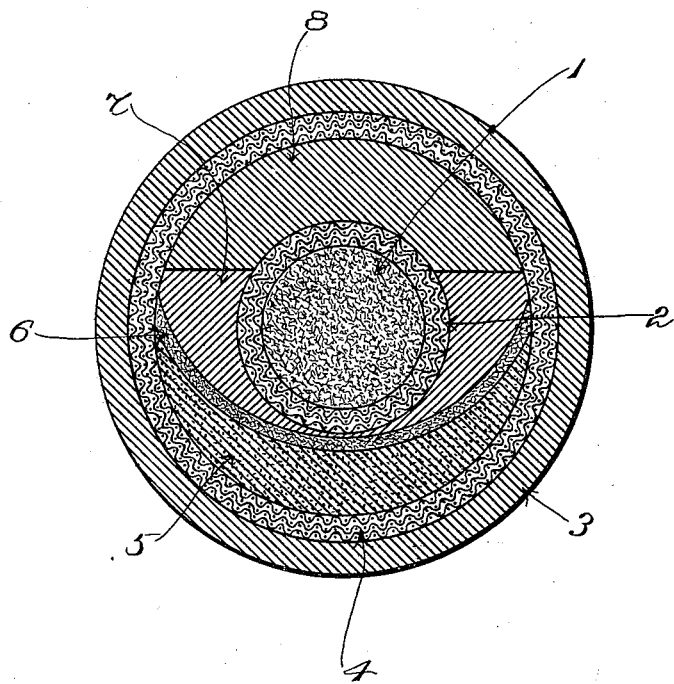
Witnesses:
Oscar F. Hill
Edith J. Anderson
Inventor:
Henry Tolman
by Macleod Calver & Randall
his Attorneys.

UNITED STATES PATENT OFFICE.

HENRY TOLMAN, OF NEWTON, MASSACHUSETTS.

ELASTIC TIRE FOR VEHICLES.

SPECIFICATION forming part of Letters Patent No. 662,177, dated November 20, 1900.

Application filed May 5, 1900. Serial No. 15,589. (No model.)

*To all whom it may concern:*

Be it known that I, HENRY TOLMAN, a citizen of the United States, residing at Newton, in the county of Middlesex, State of Massachusetts, have invented a certain new and useful Improvement in Elastic Tires for Vehicles, of which the following is a specification, reference being had therein to the accompanying drawing.

The invention has for its general object to produce an elastic tire which shall be fitted especially for use in connection with heavy vehicles—for example, of the automobile class.

The invention consists in the novel features of construction which hereinafter are fully described in the course of the following specification with reference to the accompanying drawing and then particularly pointed out and distinctly defined in the claims at the close thereof.

In the drawing I have represented in cross-section one convenient form of tire embodying the invention.

My tire comprises, essentially, a central yielding member, an exterior member or envelop, and an intermediate member constituting a body or filler. The particular characteristics of the said members will be recited in the course of the description.

In the illustrated embodiment of the invention the central yielding member comprises a core 1 and a reinforcing-tube of fabric 2 in connection with such core. The said core may vary in character. It consists herein of a compacted volume of suitable stuffer material of any of the approved kinds heretofore proposed for use in the like connection, felt being deemed preferable by me. The reinforcing-tube 2 surrounds the felt core 1 and consists, by preference, of a plurality of plies which in practice will or may be united together by rubber.

The exterior member or envelop comprises, essentially, the rubber layer 3 and the reinforcing-tube of fabric 4, the said tube being composed, preferably, of a plurality of plies which are united to one another by rubber, the said tube 4 and the rubber layer 3 being vulcanized together.

The intermediate member constituting the body or filler is composite. On the tread side of the tire is an elastic portion 5, which in cross-section constitutes a segment, the said portion preferably being tapered toward its side edges, and thereby rendered crescent shape in order to give in use an action which is graduated toward the sides of the tire, thereby securing the best results with an economical employment of material and without interfering with the general firmness, strength, and durability of the tire. As will be obvious, in use the load acts to compress the tire most at the middle of its width, the degree of compression diminishing toward the sides of the tire. For the attainment of the best results in practice I form the said crescent-shaped portion of sponge rubber. Next the upper side of the segment or crescent 5 I employ a layer 6 of suitable material, as felt, it extending transversely across the interior of the tire, constituting an interior stay against transverse strain and intervening between the segment of crescent 5 and the remainder of the body or filler. The said remainder is composed of any suitable material, being preferably of rubber, around at least the greater part of the central member, as at 7. The part 8 of said body or filler on the side of said central member which is toward the rim of the wheel to which the tire is applied in practice may be of rubber also, or it may be of other filler material, as preferred.

I claim as my invention—

1. A vehicle-tire comprising a yielding central member provided with a reinforcing-tube of fabric, an external envelop having in connection therewith a reinforcing-tube of fabric, and an intermediate filler comprising in part an elastic segment at the tread side of the tire, substantially as described.

2. A vehicle-tire comprising a yielding central member, an external envelop having in connection therewith a reinforcing-tube of fabric, and an intermediate filler surrounding said central member and comprising in part a crescent of rubber at the tread side of the tire, substantially as described.

3. A vehicle-tire comprising a yielding central member provided with a reinforcing-tube of fabric, an external envelop having in connection therewith a reinforcing-tube of fabric, and an intermediate filler comprising in part a crescent of "sponge" rubber at the tread side of the tire, substantially as described.

4. A vehicle-tire comprising a core of compacted yielding stuffer material, a reinforcing-tube of fabric surrounding said core, an external envelop having in connection therewith a reinforcing-tube of fabric, and an intermediate filler comprising in part an elastic segment at the tread side of the tire, substantially as described.

5. A vehicle-tire comprising a core of compacted stuffer material, a reinforcing-tube of fabric surrounding said core, an external envelop having in connection therewith a reinforcing-tube of fabric, and an intermediate filler comprising in part a crescent of "sponge" rubber at the tread side of the tire, substantially as described.

6. A vehicle-tire comprising a yielding central member, an external envelop having in connection therewith a reinforcing-tube of fabric, and an intermediate filler comprising an elastic segment at the tread side of the tire, an adjacent elastic section, and a transversely-extending strip intervening between the two, substantially as described.

7. A vehicle-tire comprising a yielding central member, an external envelop, reinforcing-tubes of fabric in connection with the said central member and envelop, and an intermediate filler comprising an elastic segment at the tread side of the tire, an adjacent elastic section, and a transversely-extending strip intervening between the two, substantially as described.

8. A vehicle-tire comprising a core of felt, a tube of fabric inclosing the same, an external envelop having in connection therewith a reinforcing-tube of fabric, and an intermediate filler comprising an elastic segment at the tread side of the tire, an adjacent elastic section, and a transversely-extending strip of felt intervening between the two, substantially as described.

9. A vehicle-tire comprising essentially an external envelop having in connection therewith a reinforcing-tube of fabric, and a body or filler comprising essentially an elastic segment at the tread side of the tire, an adjacent elastic section, and a transversely-extending strip intervening between the two, substantially as described.

In testimony whereof I affix my signature in presence of two witnesses.

HENRY TOLMAN.

Witnesses:
   CHAS. F. RANDALL,
   ALICE H. MORRISON.